United States Patent [19]

Hofstein

[11] Patent Number: 4,571,642

[45] Date of Patent: Feb. 18, 1986

[54] METHOD OF AND APPARATUS FOR MODIFYING A VIDEO SIGNAL TO PREVENT THE UNAUTHORIZED RECORDING AND REPRODUCTION THEREOF

[76] Inventor: Steven R. Hofstein, 44 Hidden Lake Dr., North Brunswick, N.J. 08902

[21] Appl. No.: 295,670

[22] Filed: Aug. 24, 1981

[51] Int. Cl.⁴ .......................... H04N 5/78; H04N 1/44
[52] U.S. Cl. ..................................... 360/37.1; 358/120
[58] Field of Search ........................ 360/37.1; 358/120

[56] References Cited

U.S. PATENT DOCUMENTS

| | | | |
|---|---|---|---|
| 3,963,865 | 6/1976 | Songer | 358/120 |
| 4,100,575 | 7/1978 | Morio et al. | 360/37.1 X |
| 4,213,149 | 7/1980 | Janko | 360/37.1 X |

FOREIGN PATENT DOCUMENTS 2055501  3/1981  United Kingdom ............... 360/37.1

Primary Examiner—Aristotelis M. Psitos
Attorney, Agent, or Firm—Ostrolenk, Faber, Gerb & Soffen

[57] ABSTRACT

An apparatus for modifying a video signal to protect the unauthorized recording and reproduction thereof is disclosed. In accordance with the invention, the video signal is modified in such a manner that insufficient vertical synchronization information is contained in some, but not all, of the vertical blanking intervals. Particularly, insufficient vertical synchronization information is contained in a sequence of vertical blanking intervals which will cause the rotational velocity of the tape head of the VTR to constantly vary.

5 Claims, 19 Drawing Figures

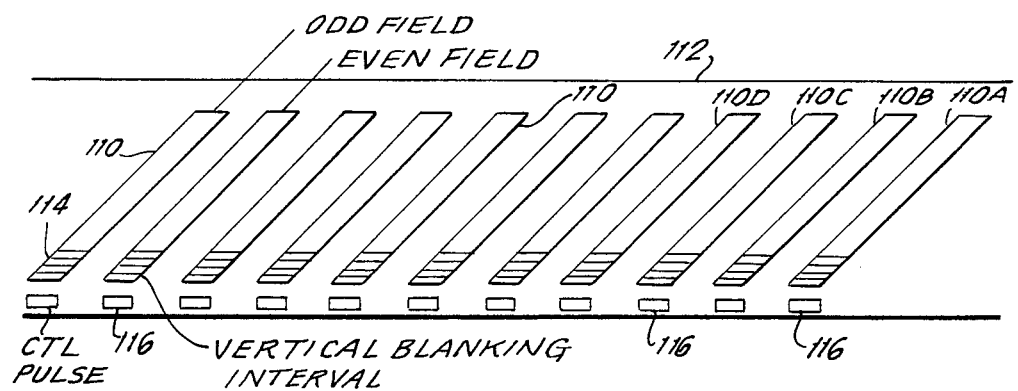
FIG. 1
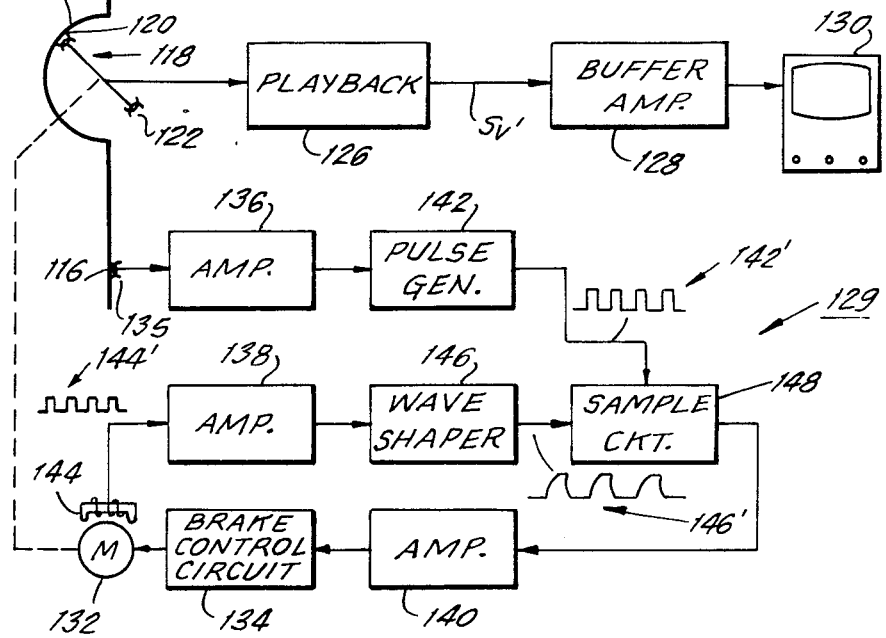
FIG. 3
FIG. 4

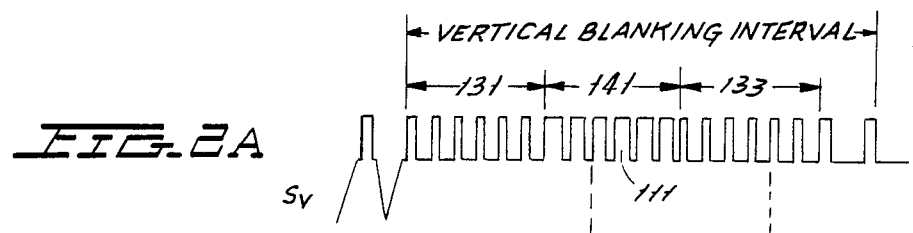
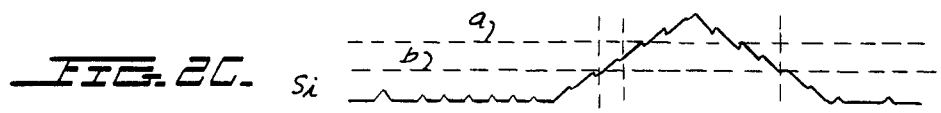
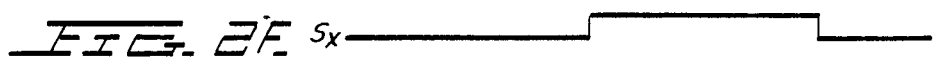
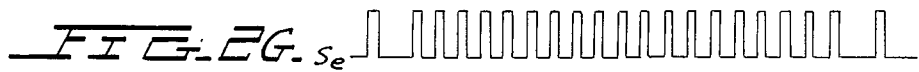
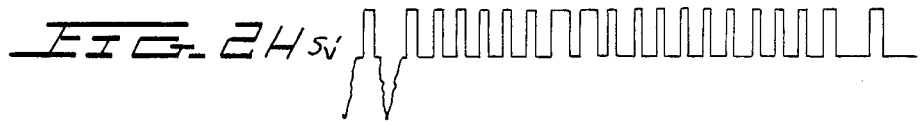

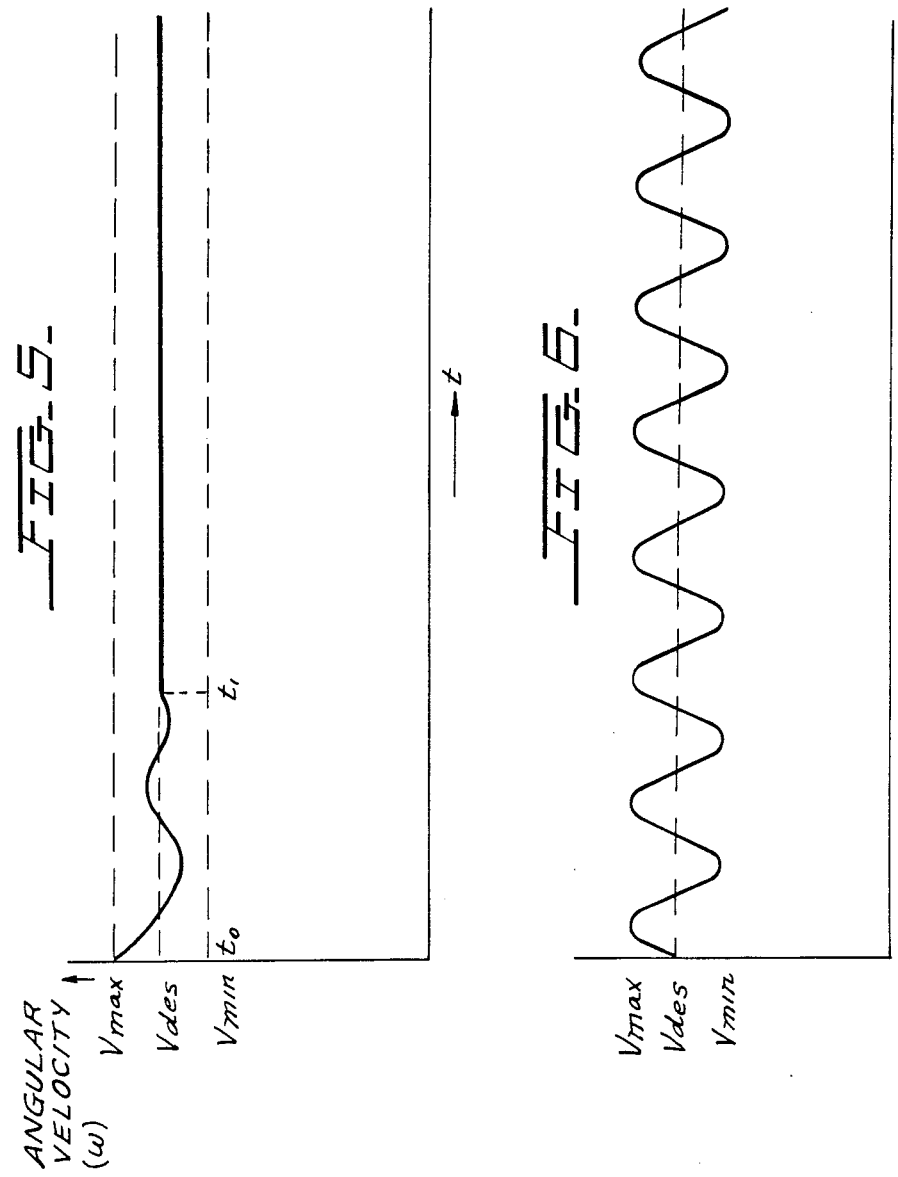

METHOD OF AND APPARATUS FOR MODIFYING A VIDEO SIGNAL TO PREVENT THE UNAUTHORIZED RECORDING AND REPRODUCTION THEREOF

BACKGROUND OF THE INVENTION

The present invention is directed towards a method and apparatus for modifying a video signal and, more particularly, to a method and apparatus wherein the vertical synchronization interval of the video signal is modified such that a video picture can be reproduced directly from the modified video signal but cannot be reproduced from a recording of the modified video signal.

With the recent introduction of video signal recording systems, such as video tape recorders (VTR), there has evolved a substantial market for copyrighted video tapes for home use. By way of example, many popular movies have been recorded on the video tapes and sold at substantial prices to the home video recorder market. As a result of the relatively high cost of these video tapes, there has been a great incentive to illegally pirate these tapes by playing them on a first VTR and recording the output signal generated by the first VTR on a blank tape contained in a second VTR.

In order to protect their investment, recorders of the copyrighted tapes have attempted to modify their tapes in such a manner that they cannot be successfully reproduced. The present invention achieves this result by modifying the video signal contained on the copyrighted tapes in such a manner that they cannot be successfully reproduced on a standard VTR. Since the video signal itself is being modified, the invention may also be successfully utilized to prevent the unauthorized recording of broadcasted television programs.

A standard video tape includes a plurality of field tracks which are evenly spaced along the length of the video tape. Each track includes all the video information required for a single TV field. The beginning of each track includes a vertical blanking interval which is followed by all of the video information for a single TV field. The vertical blanking interval includes a serrated vertical synch pulse formed of a plurality of sub-pulses which are utilized by the vertical oscillator located in a television monitor to properly locate the beginning of each frame of information at the top to the TV picture. This information is essential to the television monitor for proper operation thereof.

In addition to the video tracks, a plurality of control pulse indicator marks are magnetically imprinted on the video tape. The control pulse indicator marks define a control track which is used by a servo mechanism in the VTR to maintain synchronism between the linear velocity of the video tape and the rotational velocity of the VTR tape head (this head contains a pair of mechanically coupled magnetic heads) when the VTR is operated in the playback mode. The control pulses are normally equal in number to the number of video field tracks and have a predetermined spaced relationship therewith. The servo mechanism of the VTR adjusts the rotational velocity of the VTR tape head as a function of the linear velocity of the control pulse indicator marks past a control pulse detector forming part of the servo mechanism. This assures proper frequency adjustment between the tape head and the video tracks. Proper phase adjustment is normally maintained by the prdetermined spacing between the video tracks and control pulse indicator marks. A manual phase control adjustment is provided for this instance where phase adjustment is lost due to machine to machine variations, tape stretching and other causes.

In accordance with the foregoing, the rotational velocity of the tape head and the linear velocity of the tape are normally synchronized to ensure that the tape head scans one video track each time it sweeps past the tape. If the control pulses are removed from the video tape, the tape head of the VTR will not stay in synchronism with the movement of the intermittently intelligible signal on a standard TV receiver. The foregoing fact has previously been recognized by the prior art as exemplified in U.S. Pat. No. 4,100,575.

A VTR is capable of operating in two modes: a playback mode and a record mode. When operating in a playback mode, the VTR monitors the frequency of the control pulses passing a first tape head adapted to scan the control pulse track and adjust the velocity of the VTR tape head scanning the video track so as to cause the VTR tape heads to remain in synchronism with the video tracks. When operating in the record mode, the VTR accepts an incoming video signal (containing both the desired video information and synchronizing pulses) and records both the video signal (including the vertical synch pulses) on the video tracks and the control pulses on the control track. The VTR records a control pulse on the control track of the video tape each time it detects the vertical synchronization pulses in the incoming video signal.

In a typical video signal, the vertical blanking interval includes a serrated vertical synch pulse (containing six sub-pulses) of a standard width (27.3 $\mu$sec). As noted above, these sub-pulses are detected by the vertical deflection circuit of a standard television monitor to control the vertical positioning of the video signal. To this end, most vertical deflection circuits include an integrating circuit which integrates the serrated vertical synch pulse. When the output of the integrating circuit reaches a predetermined level, the vertical deflection circuit "recognizes" the presence of a vertical synchronization pulse and causes the vertical oscillator to return the scanning beam to the top of the video tube, thereby maintaining the vertical oscillator of the TV monitor in synchronism with the vertical oscillator of the television camera.

The serrated vertical synch pulse is also used by the VTR to synchronize the motion of its magnetic tape head and the video tape when the VTR is operating in the record mode. Like the television monitor, the VTR normally includes an integrating circuit which integrates the serrated vertical signal pulse. When the output of the integrator reaches a predetermined level, the VTR "recognizes" the presence of a vertical synch signal and records a control pulse on the control track of the video tape. Significantly, the sensitivity of the video monitor integrating circuit is much greater than that of the VTR integrating circuit. Thus, while the time constant of the television monitor integrating circuit is relatively short, that of the VTR integrating circuit is relatively long. This difference in sensitivity can be used to modify the serrated vertical synch pulse in a manner which makes the pulse "visible" (i.e., detectable) to the video monitor but "invisible" (i.e., not detectable) to the VTR.

One method for modifying the serrated vertical synch pulse is disclosed in U.S. Pat. No. 4,100,575. In this patent, the vertical synch pulse is modified to include only 2 sub-pulses so as to make the modified pulse visible to the television monitor but invisible to the VTR. Another method for modifying the serrated vertical synch pulses is to maintain all 6 sub-pulses but to reduce their width (e.g., to 13.7 μsec). Yet another method would be to reduce the height of the sub-pulses or to cause certain sub-pulses to pulse in the negative direction. For the purpose of this invention, any method which will modify the vertical synch pulses in a manner in which they can be detected by the video monitor but not detected by the VTR can be used.

In order to prevent the unauthorized copying of video information on a VTR operating in the record mode, the prior art, as exemplified by U.S. Pat. No. 4,100,575, modifies the video signal in such a manner that each (or at least every other) serrated vertical synch pulse contains only two sub-pulses. As a result, the video signal contains sufficient information to enable the TV monitor to detect the vertical blanking interval (and thereby maintain proper vertical alignment of the video signal) but does not contain sufficient information to enable the VTR to detect the vertical blanking interval (and thereby record a control pulse on the video tape). As a result, any tape recording reproduced on the VTR receiving the modified video signal does not contain the standard control pulses and cannot be used to successfully reproduce a video picture on a standard television monitor when placed in a VTR operating in the playback mode.

BRIEF SUMMARY OF THE INVENTION

While the system described in U.S. Pat. No. 4,100,575 has been somewhat successful, the copy tape made from the modified video signal does intermittently provide a video signal which can be viewed on the television monitor. The reason for this result is discussed in greater detail below. In order to overcome this drawback, the present invention modifies the video signal in such a manner that insufficient vertical synch information is contained in some, but not all, of the vertical blanking intervals. Particularly, insufficient vertical synch information (i.e., VTR "invisible pulses) is contained in that sequence of vertical blanking intervals which will cause the rotational velocity of the tape head of the VTR to constantly vary. The particular degree of variation required will depend upon the sensitivity of the VTR to such disturbances. While it is preferred that the variations be of a sufficient degree to ensure that no viewable video picture whatsoever is presented when the copy tape is played back on the VTR, it is sufficient in most cases to disturb the operation of the servo system to a sufficient degree to prevent the reproduction of a standard video picture more than 50% of the time.

In the preferred embodiment, the pattern of modified vertical synch signals constantly changes to ensure that the copy tape will produce the desired perturbations in the operation of the servo systems of a number of different commercially available VTR's. Since the particular sequence of modified vertical synch signals which will produce the desired result depends on the particular operation of a given VTR, the present invention contemplates providing a number of different pattern sequences, each of which is designed to cause a desired effect on a selected VTR. At present, there are primarily three different VTR models on the market (each model being sold by several different companies). Each model will react in the desired fashion to a different pattern of modified vertical synch pulses. In the preferred embodiment, the vertical synch information in the original video tape will be modified such that each of the required patterns is interspaced throughout the tape, each pattern repeating for one or two second intervals.

BRIEF DESCRIPTION OF THE DRAWINGS

For the purpose of illustrating the invention, there is shown in the drawings one embodiment which is presently preferred, it being understood, however, that this invention is not limited to the precise arrangements and instrumentalities shown.

FIG. 1 illustrates the manner in which video field tracks are oriented on a video tape;

FIGS. 2A through 2H illustrate various signals which appear in the recording circuit of FIG. 7;

FIG. 3 is a schematic representation of a tape head of a VTR;

FIG. 4 is a block diagram of the playback circuit of a VTR;

FIG. 5 is a graph illustrating the operation of the feedback circuit of FIG. 4;

FIG. 6 is a graph illustrating the operation of the feedback circuit of FIG. 4 when the VTR of FIG. 4 plays back a video cassette modified in accordance with the principles of the present invention;

DETAILED DESCRIPTION OF THE INVENTION

Figure 7:
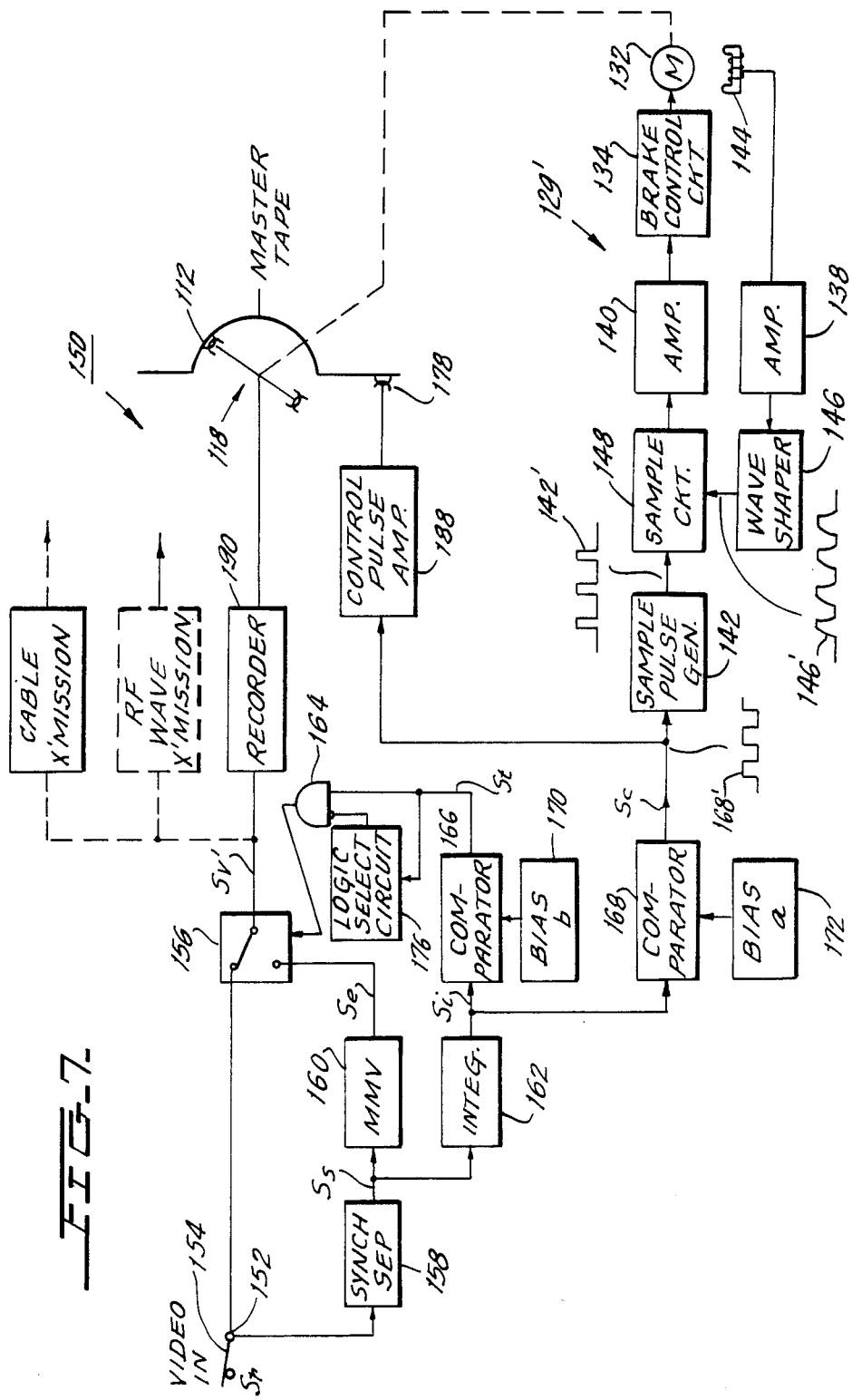
FIG. 7 is a block diagram of a recording circuit which may be used to modify a video signal in accordance with the principles of the present invention.

As shown in FIG. 1, a standard video tape includes a plurality of video tracks or fields 110 which are evenly spaced along the length of a video tape 112. Each track 110 includes all the video information required for a single TV field. The beginning of each track 110 includes a vertical blanking interval 114 which is followed by all of the video information for a single TV field. As shown in FIG. 2A, the vertical blanking interval (described in further detail below) includes a plurality of vertical synch pulses 111 which are utilized by the vertical oscillator located in a television receiver to properly locate the beginning of each frame of information at the top of the TV picture. This information is essential to the television receiver for proper operation thereof.

In addition to the foregoing video tracks 110, a plurality of control pulse indicator marks 116 are magnetically imprinted on the magnetic tape 112. One control pulse provided for each video track 110 and serves to ensure that the tape head of the video tape recorder (VTR) will properly scan each field 110. The tape head 118 of a VTR is shown schematically in FIG. 3. As shown therein, the tape head includes a pair of magnetic heads 120, 122 which are located on either side of the tape head 118 and which are rotated about a central axis 124. As the tape 112 is moved past the tape head 118, one of the magnetic heads 120, 122 is rapidly moved across that video track 110 which is located adjacent the tape head 118. Each magnetic head 120, 122 scans every other video track 110 as the tape 112 moves past the tape head 118. By way of example, magnetic head 120 scans the tracks 110A and 110C in FIG. 1 while magnetic head 122 scans the tracks 110B and 110D in FIG. 1.

In order to ensure proper operation of the VTR, the rotary movement of tape head 118 must be synchronized with the linear movement of the tape 112 such that one of the magnetic heads 120, 122 scans each successive video track 110A, 110B as the tape 112 is moved past the tape head 118. Particularly, the angular rotation of tape head 118 about axis 124 must be maintained at a velocity which is in synchronism with the linear velocity of the magnetic tape 112 such that magnetic head 120 moves across tape 112 when track 110A is adjacent tape head 118, magnetic head 122 moves across tape 112 when track 110B is adjacent magnetic head 112, etc. If the angular velocity of tape head 118 is permitted to vary with respect to the linear velocity of magnetic tape 112, the magnetic heads 120, 122 could scan across magnetic tape 112 in the areas located in between the tracks 110 or could scan portions in two adjacent tracks at one time. In order to avoid this problem, the conventional video tape 112 includes a series of control pulses 116 located at the bottom of the tape 112. A standard servo system is utilized to adjust the rotational speed of tape head 118 as a function of the control pulse indicator marks 116 so as to ensure appropriate timing. As should be clear from the foregoing, the proper operation of the VTR depends upon the presence of the control pulse indicator marks 116. The manner in which these control pulses synchronize the rotation of tape head 118 to the linear movement of tape 112 may best be understood with reference to FIG. 4.

As shown in FIG. 4, the video information recorded on tape 112 is picked up by tape head 118 which is coupled to a conventional playback circuit 126 whih generates the reproduced video signal Sv'. The reproduced video signal Sv' is applied to a buffer amplifier 128 for display on a television receiver 130. In order to ensure that each magnetic head 120, 122 is properly aligned with the appropriate video track 110, the VTR includes a feedback circuit 131 which controls the rotary speed of tape head 118 as a function of the frequency of the control pulse indicator marks 116 formed on tape 112.

In accordance with U.S. standards, a conventional television produces sixty fields or thirty frames per second. As such, the tape head 118 must nominally be rotated at 30 revolutions per second to ensure that 60 fields 110 are scanned per second. Additionally, the tape 112 must be moved past the tape head 118 at a linear velocity which will cause 60 video tracks 110 to pass the tape head 118 during each second. In practice, it is quite difficult to maintain the linear speed of tape 112 past head 118 at a speed exactly corresponding to 60 video tracks per second. As a practical matter, the linear speed of the tape past the tape head 118 normally varies between, for example, 59.2 and 60.8 tracks per second. In order to maintain proper alignment between the magnetic heads 120, 122 and the video tracks 110, it is necessary to vary the rotational velocity of tape head 118 between 29.6 and 30.4 revolutions per second (since the tape head 11 includes two magnetic heads 120, 122).

In order to attain this result, tape head 118 is driven by a motor 132 which normally rotates tape head 118 at a velocity of 30.4 revolutions per second. The speed of motor 132, and, therefore, the speed of tape head 118, may be reduced by a brake control circuit 134 down to a minimum speed of 29.6 cycles per second so as to adjust the rotational velocity of tape head 118 to coincide with the linear velocity of video tape 112.

The operation of brake control circuit 134 is controlled by a feedback circuit 129 including magnetic head 134, amplifiers 136, 138, 140, pulse generator 142, pickup coil 144, wave shaper circuit 146 and sample circuit 148. Magnetic head 135 is located adjacent the bottom of tape 112 and detects the presence of control pulse indicator marks 116 as video tape 112 is moved past tape head 118. Magnetic head 135 generates an output signal which is amplified by amplifier 136 and applied to pulse generator 142. Pulse generator 142 generates a single output pulse 142' for each control pulse indicator mark detected by magnetic head 135. Each pulse 142' is applied to sample circuit 148 which also receives pulses 146' which are generated by wave shaper 146 and take the form illustrated. Wave shaper 146 receives an input signal from amplifier 138 which amplifies transducer pulses generated by a pickup coil or transducer 144. Magnetic elements (not shown) are located 180° apart on the output shaft of motor 132 and rotate past pickup coil 144. As a result, pickup coil 144 generates pickup pulses 144' at a frequency equal to the rotational velocity of the output shaft of motor 132 and, therefore, equal to the rotational velocity of tape head 118. As a result of the foregoing, the frequency of pulses 144' is indicative of the rotational velocity of tape head 118 while the frequency of the pulses 142' generated by pulse generator 142 is indicative of the linear velocity of tape 112.

As noted above, the pulses 144' generated by pulse coil 144 are amplified by amplifier 138 and applied to wave shaper circuit 146. The wave shaper circuit 146 may include a monstable multivibrator which generates a pulse of a predetermined duration in response to each pulse generated by pickup coil 144. The output of the monostable vibrator is coupled to an integrating circuit preferably formed of a capacitor which is charged during the rise time of the monostable multivibrator output pulse and which is discharged during the decay time of this pulse. The resultant pulse wave form generated at the output of wave shaper circuit 146 is depicted by wave form 146'. The pulses 142' generated by pulse generator 142 cause sample circuit 148 to sample the decaying portion of each pulse in the wave form 146'. The magnitude of the sampled pulse varies as a function of the phase difference between the pulses generated by magnetic head 135 and the pulses generated by pickup coil 144. As such, the magnitude of the signal applied to amplifier 140 varies as a function of the relative velocity of tape 112 and tape head 118. Brake control circuit 134 adjusts the speed of motor 132 as a function of this signal to ensure that the angular velocity of tape head 118 properly coincides with the linear velocity of video tape 112.

The foregoing phenomenon may best be understood with reference to FIG. 5, which illustrates the manner in which the feedback circuit 129 causes the angular velocity of tape head 118 to be adjusted to the desired angular velocity Vdes corresponding to the linear velocity of video tape 112 (for purposes of simplicity, it is assumed that the actual linear velocity of tape 112 remains at a constant velocity during the illustrated period). It is assumed that at time t0, the video tape recorder is initially turned on and video tape 112 begins moving past tape head 118 at a steady linear velocity which will cause 60 video tracks to move past tape head 118 per second. At this instant, motor 132 will initially drive tape head 118 at the maximum velocity Vmax (e.g., 30.4 cycles/sec). Immediately thereafter, feedback circuit 129 begins reducing the angular velocity of motor 132, and, therefore, the angular velocity of tape head 118, towards the minimum velocity Vmin (e.g., 29.6 cycles/sec) in order to bring the angular velocity of tape head 118 to the desired value Vdes corresponding to the actual linear velocity of video tape 112. As shown in FIG. 5, feedback circuit 131 causes the velocity of motor 132 to reach the desired value Vdes in a damped oscillating manner wherein the angular velocity of motor 132 zeroes in on the desired velocity Vdes at time tl. In a standard video tape recorder, this stabilization occurs after one or two seconds. Thereafter, if there are any small variations in the linear velocity of tape 112, feedback circuit 129 will adjust the speed of motor 132 in a similar damped oscillating manner so as to adjust the speed of motor 132, and, therefore, the speed of tape head 118, to the new desired value V'des (not shown).

It should be apparent from the foregoing that feedback circuit 129 maintains synchronism between the tape head 118 and the video tape 112 only as long as all or substantially all control pulse indicator marks 116 are provided on tape 112. If these marks are totally omitted, motor 132 drives tape head 118 at the maximum angular velocity (30.4 cycles per second in the example given) causing the magnetic heads 120, 122 to sequentially run in phase and out of phase with video track 110. As a result, video information is only intermittently applied to playback circuit 126 and the video picture appears intermittently on television receiver 130. This phenomenon is employed by the prior art to enable the modification of the recorded video signal on a prerecorded tape in a manner which prevents the effective reproduction thereof on a second blank video tape. Particularly, the video signal recorded on the prerecorded video tape will be modified in such a manner that when an attempt is made to reproduce the video signal on a second video tape using a standard video tape recorder, the video tape recorder will be unable to record the control pulse indicator marks 116 on the copied tape. As a result, if the copied tape is played on a standard video recorder, the tape head of the video recorder will rotate at its maximum level (e.g., 30.4 cycles/sec) and a video picture will only intermittently appear (typically every 5 of 7 seconds) on a television receiver hooked up to the video tape recorder.

While the foregoing method has been somewhat successful the copied tape does intermittently provide a video signal which can be viewed on the television monitor. The present invention overcomes this drawback by modifying the video information stored on the master tape in such a manner that any copy made of that tape will contain control pulse indicator marks at only predetermined ones of the video tracks 110. The particular pattern of video tracks having control pulse indicator marks is chosen such that the servo system of the VTR maintains the angular velocity of the VTR tape head in a constantly varying state. The particular degree of variation required will depend upon the sensitivity of the VTR to such disturbances. While it is preferred that the variations be of a sufficient degree to ensure that no viewable video picture whatsoever is presented when the copy tape is played back on the VTR, it is sufficient in most cases to disturb the operation of the servo system to a sufficient degree to prevent the reproduction of a standard video picture more than 50% of the time.

The particular pattern of video tracks having control pulse indicator marks which will cause the desired perturbations in the operation of the servo system will vary from one model of VTR to the other. Accordingly, the particular sequence used should be determined by experimentation. One possible sequence of control pulse indicator marks is to provide one control pulse indicator mark 116 for every five video tracks 110 throughout the length of the copy tape. An expected result of the use of such a pattern of indicator marks is illustrated in FIG. 6. As shown therein, the feedback circuit 129 intermittently attempts to adjust the speed of motor 132 to be in sychronism with the speed of video tape 112 in accordance with the pattern of intermittent indicator marks 116 and motor 132 remains in a sufficiently constant state of oscillation to ensure that the magnetic heads 120, 122 of tape head 118 are never aligned with a sufficient consecutive number of video tracks 110 to enable the reproduction of a satisfactory video signal on the TV monitor 130.

Another possible pattern of control pulse indicator marks is as follows: one control pulse indicator mark for every ten video tracks for a period of 30 video tracks, followed by 15 consecutive control pulse indicator marks. It has been found that this pattern of control pulse indicator marks causes the servo system of the VTR to maintain the rotational velocity of its tape head in a sufficiently varying state to ensure that the video picture obtained when the copy tape is played back on the VTR exhibits a constant variation in width which prevents any intelligible viewing of the video picture.

Since the particular sequence of control pulse indicator marks which will produce the desired result depends on the particular operation of a given VTR, the present invention contemplates providing a number of different patterns of sequences along the length of the video tape, each of which is designed to cause the desired effect on a selected VTR. At present, there are primarily three different VTR models on the market (each model being sold by several different companies). Each model will react in the desired fashion to a different pattern of control pulse indicator marks. In the preferred embodiment, each of the required patterns of control pulse indicator marks will be interspaced throughout the tape, each pattern repeating for one or two second intervals.

Once it has been determined which sequence of indicator marks should be used to obtain the foregoing results, circuitry must be provided to modify the incoming video signal to ensure that the desired pattern of indicator marks will be reproduced on the copy tape being recorded on the VTR. One such circuit is illustrated in FIG. 7. As noted above, the video signal is modified by modifying the vertical synchronization pulses contained in predetermined ones of the vertical blanking intervals of a standard video signal. Before describing the circuit of FIG. 7, it is helpful to examine the contents of the vertical blanking interval of a standard video signal.

As shown in FIG. 2A, a standard video signal Sv includes a vertical blanking interval including a first set of equalizing pulses 131 followed by a serrated vertical synch pulse 141 (formed of five sub-pulses 111) and a second set of equalizing pulses 133. The duration of each sub-pulse 111 is substantially greater than the duration of the synchronizing pulses 131, 133 and is detected by both the television monitor and the VTR as indicating the beginning of a new video frame. The television monitor detects the vertical synch pulse 141 and uses it to properly synchronize the vertical scan of each frame of the video picture. The VTR detects pulse 141 during the recording mode and uses them to record control pulse indicator marks 116 on the video tape 112.

The vertical synchronizing circuit of a standard television monitor detects the vertical synch pulse 141 by integrating the sub-pulses 111. When the output of the integrator reaches a predetermined value, the vertical synchronizing circuit will "recognize" the presence of a vertical synch pulse 141 and will cause the vertical oscillator to return the scanning beam to the top of the video tube. The integrator of the television monitor is relatively sensitive and possesses a short time constant. As such, the output of the integrator will reach the predetermined level in a relatively short period of time. In a typical television monitor, the integrator will reach the predetermined level after 2 standard sub-pulses 111 have been detected.

Like the television monitor, a standard VTR normally uses an integrator to detect the presence of the vertical synch signal 141. Significantly, however, the integrator in the VTR is not as sensitive as that in the television monitor (i.e., it has a longer time constant) and, therefore, will not normally "recognize" the presence of a vertical synch signal 141 until at least four sub-pulses 111 have been detected. This fact is used by the present invention to prevent the successful copying of a TV signal (generated either as a result of a television broadcast or as a result of the playback of a prerecorded video tape) on a standard VTR. Particularly, this invention modifies selected vertical drive pulses in a manner which will make them "visible" to the standard television monitor but "invisible" to the standard VTR. Such signals which are visible to the television monitor but invisible to the VTR will be referred to herein as "modified vertical synch pulses". Signals which are visible to both the VTR and the television monitor will be referred to as "nonmodified vertical synch pulses".

Figure 9A:
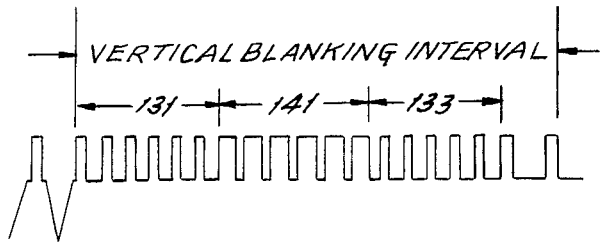
FIG. 9A illustrates the vertical blanking interval of a standing video signal.
Figure 9B:
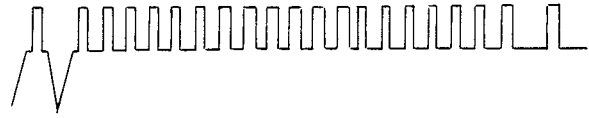
FIGS. 9B through 9D illustrate vertical blanking intervals which have been modified in accordance with the present invention.
Figure 9C:
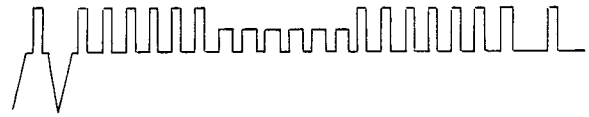
Figure 9D:
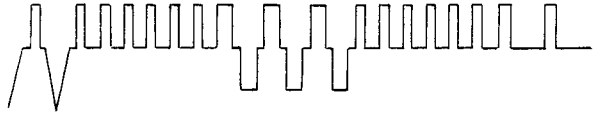

Since the integrating circuit of the television monitor and the VTR integrate the total area under the curve which represents the vertical synch pulse 141, the pulse can be modified in any manner which will vary the area under this curve by a sufficient amount to prevent detection by the VTR but to permit detection by the television monitor. One way of so modifying the vertical synch pulse 141 is to reduce the number of sub-pulses 111 as illustrated in FIG. 2H. The vertical synch pulses 141 can be modified in other manners which will make it "visible" to the TV monitor but "invisible" to the VTR. Thus, in FIG. 9B, the width of each sub-pulse 111 has been reduced by sufficient degree to prevent the integrator in the VTR from reaching its threshhold level which would cause a detection of the vertical synch pulse 141 but remain sufficiently wide to permit the integrator of the television monitor to reach its predetermined level so as to initiate vertical scan flyback. In FIG. 9C, the width of the pulses have been maintained constant but the height thereof has been reduced. In FIG. 9D, certain positive going pulses have been replaced by negative going pulses which will effect the integrating sequence. Other variations which will achieve the desired result will be apparent to those of ordinary skill in the art.

In the foregoing description, it has been assumed that the synch detector circuits of the VTR and television monitor are both integrating type circuits. While most VTR's and television monitors use such detectors, some video monitors use a synchronous or timing detector which looks for the presence of sub-pulse 111 a predetermined time period after the leading edge of the synchronizing pulse 141. When modifying a tape for use with such systems, each vertical synch pulse 141 is modified in a manner which will permit the video monitor to recognize the presence of the vertical synch pulse but will prevent the VTR from doing so. For example, in the Advent system, the synchronous detector looks for the presence of a pulse at a time period corresponding to the middle of the second sub-pulse 111 of a standard serrated vertical synch signal 141. If the vertical synch pulse 141 is modified by the removal of the last three sub-pulses 111 as described below, such a modified pulse will be visible to the Advent television monitor but invisible to the standard VTR which will use an integrator having a long time constant.

In accordance with the present invention, only selected ones of the vertical drive pulses of the original video signal are modified in order to ensure that the feedback loop of the video tape recorder (which feedback loop attempts to synchronize the movement of the tape head 118 to the movement of the tape 112) is kept in a substantially constant state of oscillation. This result may be achieved (by way of example) by modifying only four out of every five consecutive vertical drive pulses such that one out of every five vertical drive pulses will be seen by the feedback circuit of the VTR which is attempting to copy a video signal contained on a prerecorded master video tape whose video signals have been modified in accordance with the present invention. One possible circuit 150 for modifying the video signal to be placed on a prerecorded master tape or to be transmitted over the airwaves in accordance with the present invention is shown in FIG. 7.

The video signal Sv to be modified is applied to the input terminal 152 of signal modifying circuit 150 via a control switch 154. The video signal Sv is applied to both a switching circuit 156 and a synch separation circuit 158. Synch separation circuit 158 is a standard circuit which separates the pulses of the vertical blanking interval (see FIG. 2A) from the remaining video information contained in the video signal. As a result, the signal Ss appearing at the output of synch separation circuit 158 includes only the vertical blanking information as illustrated in FIG. 2B. This signal is applied to a monostable multivibrator 160 and an integrating circuit 162. Monostable multivibrator 160 generates a single output pulse of a predetermined duration at its output responsive to each pulse applied to its input. The resultant pulse train Se is illustrated in FIG. 2G. As sown therein, the width of each pulse generated by multivibrator 160 is chosen to be equal to the width of the equalizing pulses 131, 133. These pulses are applied to the lower input of switch 156. Switch 156 is preferably an electronic switch which applies either the signal Sv or the signal Se to the recorder 190 depending on the state of the output of AND gate 164.

When the output of AND gate 164 is at the binary "0" level, switch 156 passes the video signal Sv unmodified to the output of switch 156. When the output of AND gate 164 is at the binary "1" level, switch 156 passes the pulses Se generated by multivibrator 160 to the output of switch 156. If the output of AND gate 164 is at the binary "1" level during a time interval corresponding to any of the sub-pulses 111 of the vertical synchronization pulses 141, the relatively narrow pulses generated by multivibratory 160 will be substituted for the relatively wide sub-pulses 111. The resultant modified video signal Sv' is illustrated in FIG. 2H and will be described in greater detail below.

The separated synchronization signals Ss generated by synch separation circuit 158 are integrated by integrator 162 so as to generate an output signal Si illustrated in FIG. 2C. As shown therein, the integration constant of integrtor 162 is chosen to be sufficiently small to ensure that the output of integrator 162 discharges in between each equalization pulse 131, 133 but does not fully discharge in between the sub-pulses 111. As a result, the output of integrator 162 remains at substantially the zero level during the interval of equalization pulses 131, integrates in a positive direction to a maximum value during the interval corresponding to the vertical synchronization pulses 141, and integrates in the negative direction down to the zero level during the interval corresponding to equalization pulses 133.

The output of integrator 162 is applied to comparators 166 and 168. Comparator 166 compares the integrated signal Si to a first biasing voltage b generated by bias circuit 170 and generates a binary "1" at its output whenever the magnitude of the integrated signal Si rises above the bias voltage b. Whenever the magnitude of the integrated signal Si is below the bias voltage b, the output of comparator 166 is at the binary "0" level. The resultant wave form St is illustrated in FIG. 2E. This signal is applied to AND gate 164 and to logic select circuit 176. The output of comparator 166 determines which vertical synchronization pulses 111 in each modified vertical blanking interval are to be modified. Logic select circuit 176 determines which vertical blanking intervals are to be modified.

Figure 8:
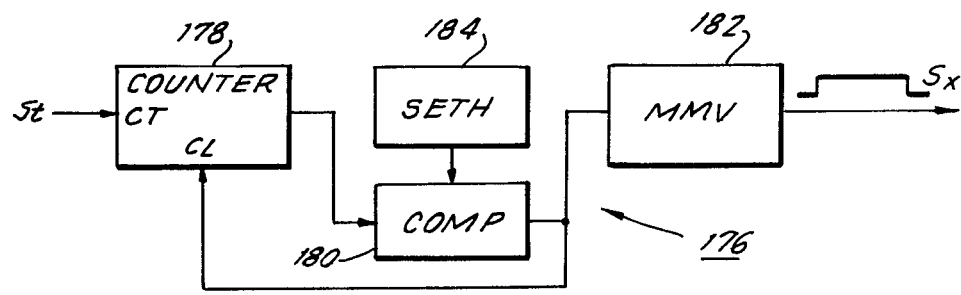
FIG. 8 is a block diagram of the logic select circuit of FIG. 7.

In the example set forth above, four out of every five vertical blanking intervals are modified. In such an embodiment, logic select circuit 176 may take the form illustrated in FIG. 8. As shown therein, logic select circuit 176 includes a counter 178, a comparator 180 and a monostable multivibrator 182. The pulses St appearing at the output of comparator 166 are applied to the count input CT of counter 178 causing the count in counter 178 to increase by 1 responsive to the leading edge of each pulse St. The count in counter 178 is applied to a comparator 180 which compares this count to a set point value determined by set point circuit 184. In the present embodiment, the set point of circuit 184 is set at 5 such that comparator 180 generates a single pulse on its output responsive to receipt of the fifth consecutive pulse St received by counter 178. This pulse is applied to monostable multivibrator 182 and to the clear input CL of counter 178. As a result, monovibrator 182 generates an output pulse Sx whose duration is at least as long as the duration of pulse St. See FIG. 2F. The output pulse appearing at the output of comparator 180 clears the count in counter 178 so as to reinitiate the counting sequence.

In accordance with the foregoing, the output of logic select circuit 178 will be at the binary "0" level for four consecutive vertical blanking interals and will be at the binary "1" level during the fifth blanking interval. AND gate 164 will, therefore, be enabled during the four consecutive vertical blanking intervals (its left input being inverted) and will be disabled during the fifth blanking interval. As a result, switch 156 modifies four consecutive vertical blanking intervals of the input video signal Sv and does not modify the fifth consecutive vertical blanking interval.

During the four vertical blanking intervals in which the output of logic select circuit 176 it at the binary "0" level, the operation of switch 156 is controlled by the output St of comparator 166. Particularly, AND gate 164 causes switch 156 to apply the output of the miltivibrator 160 to recorder 190 whenever the output of comparator 166 is at the binary "1" level. As shown in FIG. 2C, the magnitude of biasing voltage b is chosen to ensure that the output St of comparator 166 does not rise to the binary "1" level unitl after the generation of at least two sub-pulses 111. As a result, the modified video signal Sv' appearing at the output of switch 156 takes the form illustrated in FIG. 2H. As shown therein, each vertical blanking interval contains two vertical synchronization pulses. If desired, a greater number of sub-pulses may be maintained as long as the total number of sub-pulses in each modified vertical blanking interval is insufficient to be detected by the VTR.

As noted above, the output Si of integrator 162 is also applied to comparator 168. Comparator 168 compares the magnitude of signal Si to the second biasing voltage a generated by bias signal generator 172. As a result of this comparison, comparator 168 generates a binary "1" at its output whenever the integrated signal Si is greater than the bias signal a and generates a binary "0" at its output at all other times. See FIG. 2D. The magnitude of bias voltage a is chosen to be higher than the biasing voltage b (see FIG. 2C) in order that each pulse of the pulse train 168' is generated after the corresponding pulse of the pulse train 166'. As a result, comparator 168 generates a pulse train 168' having a frequency equal to the vertical synchronization frequency. This signal is applied to a feedback circuit 129' and control pulse amplifier 188.

Control pulse amplifier 188 receives the pulses of the pulse train 168' generated by comparator 168, amplifies these pulses and applies them to magnetic head 178. Since the frequency of pulses of the pulse train 168' is equal to the frequency of the vertical blanking interval of the video signal Sv, the spacing of the control pulses 116 on tape 112 will correspond to the frequency of the video blanking interval of the video signal Sv.

Pulse train 168' is also applied to feedback circuit 129'. Feedback circuit 129' is identical in structure and operation to feedback circuit 129' described above with reference to FIG. 4. As such, feedback circuit 129' will adjust the rotational velocity to tape head 118 in a manner which will ensure that tape head 118 is maintained in synchronism with the control pulses applied to tape 112.

The modified video signal Sv' appearing at the output of switch 156 is applied to a standard video recorder circuit 190 whose output is applied to tape head 118 and recorded on master tape 112. As a result, the vertical blanking interval of each video track 110 recorded on master tape 112 will be modified as shown in FIG. 2H. If this tape is then replayed on a standard VTR, the resultant video signal will contain sufficient vertical synchronizing information to enable proper operation of a standard TV monitor but will contain insufficient information to permit the successful recording of the master tape on a second video tape.

As described above, the modified video signal Sv' will normally be recorded on a master tape 112. If desired, however, this signal may be transmitted by cable or radio waves to a remote receiving station. This signal will permit proper operation of a television monitor located at the remote location but will prevent the successful recording of the remote video signal by a VTR located at the remote location.

In the embodiment described above, the modified video signal illustrated in FIG. 2H is recorded on a master video tape. The master video tape is then played back on a standard VTR and the output of the VTR is applied to a second VTR which attempts to copy the tape on a copy video tape. While this represents the preferred embodiment of the present invention, it should be recognized that the present invention encompasses any video signal modified in the manner described. Thus, the video signal may be stored on a video disk or may be transmitted via the public air waves. The primary limitation is that the video signal is modified in such a manner (e.g., as shown in FIG. 2H) that when the signal is applied to the VTR, the feedback circuit of the VTR will cause the relative velocity of the tape head 118 and the video tape 112 to remain in a constant state of oscillation. As long as this limitation is met, the received video signal will not be properly recorded on the copy tape and, if an attempt is made to play back the copy tape on a VTR, the tape head of the VTR will remain sufficiently out of phase with the copy tape to ensure that a television receiver connected to the VTR will not reproduce a suitable video picture.

Most, if not all, commercially available VTR's use a feedback circuit which operates as an under damped second order system. That is, the system contains sufficient damping to ensure that the tape head will not indefinitaly oscillate in response to a step function applied to the input of the feedback circuit. In the preferred embodiment of the present invention, the video signal is modified in a manner which when applied to a VTR feedback circuit of this type will cause the tape head to remain in a constant state of oscillation.

One drawback of the prior art anti-piracy systems is that the audio track on the video tape is not significantly affected by the protective measures taken in the prior art systems. The audio track is normally recorded on the video tape 112 as a continual linear track extending along the length of the tape 112 at a position adjacent indicator marks 116. This audio track is substantially identical to an audio track found on a standard audio tape.

In accordance with the prior art anti-piracy systems, such as that described in U.S. Pat. No. 4,100,575, the video signal is modified in a manner which will prevent the VTR from recording any control pulse indicator marks 116 or alternatively from recording every other indicator mark. As a result, feedback circuit 129 will maintain the rotational velocity of tape head 118 at a constant maximum value (e.g., 30.4 revolutions per second). Since this velocity is constant, the linear velocity of tape 112 will be substantially constant and the tape head protecting the video track will produce an intelligible audio output signal.

In accordance with the preferred embodiment of the present invention, the vertical blanking intervals of the video signal are varied in a manner which will cause only predetermined control pulse indicator marks 116 to be recorded on the video tape 112 in such a pattern and manner that the rotational velocity of tape 118 will continually oscillate between the maximum and minimum values Vmax and Vmin as illustrated in FIG. 6. This variation in the rotational velocity of tape head 118 will cause a corresponding variation in the drag on tape 112 and will, therefore, vary the linear motion of tape 112 in a similar oscillating manner. This variation in the linear velocity of tape 112 will cause a variation in the frequency (a "wow") in the audio signal generated by the tape head detecting the audio track, and will severely degrade the quality of the audio signal.

Although a preferred embodiment of the present invention has been described in detail by way of illustration only, many modifications and variations thereof will now be apparent to one skilled in the art, and, accordingly, the scope of this invention is to be limited not by the details of the preferred embodiment described herein, but only by the appended claims.

What is claimed is:

1. Apparatus, comprising:
  (A) a video tape, comprising:
    (1) a magnetic tape;
    (2) a plurality of video tracks formed on said tape; and
    (3) a control track, including a plurality of control pulse indicator marks formed on said tape;
  (B) a television monitor for displaying a TV image responsive to a video input signal applied thereto;
  (C) a video tape recorder comprising:
    (1) a rotating magnetic head adapted to convert magnetic information located on said tape into an electrical signal;
    (2) a processing circuit for processing said electrical signal and for generating an output signal representative thereof;
    (3) means for moving said tape across said magnetic head in such a manner that, if the relative motion of said magnetic head and said tape is properly synchronized, said magnetic head converts magnetic information contained in a different one of said video tracks into an electrical signal each time said magnetic head is rotated past said tape;
    (4) means for applying said output signal to said television monitor as a video input signal; and
    (5) means for adjusting the relative movement of said magnetic head and said tape as a function of the location of said control pulse indicator marks, the location of said control pulse indicator marks interacting with said adjusting means to cause the rotational velocity of said magnetic head to constantly oscillate between a maximum and a minimum value, the location of said control pulse indicator marks varying according to a plurality of predetermined patterns, each pattern being interspaced throughout the length of said video tape and repeating for predetermined time intervals.

2. Apparatus according to claim 1, wherein the location of said control pulse indicator marks is chosen such that the rotational velocity of said magnetic head varies to a sufficient degree to ensure that substantially no intelligible information is displayed on said TV monitor in response to said output signal.

3. Apparatus, comprising:
  (A) a video tape, comprising:
    (1) a magnetic tape;
    (2) a plurality of video tracks formed on said tape;
    (3) a plurality of control pulse indicator marks formed on said magnetic tape;
  (B) a video tape recorder, comprising:

(1) a rotating magnetic head for converting magnetic information contained in said video tracks into an electrical signal when said magnetic head passes over said video tracks;

(2) a processing circuit responsive to said electrical signal for generating an output signal indicative of the information contained in said electrical signal;

(3) means for moving said tape across said magnetic head; and (4) feedback circuit means for adjusting the relative speed of said tape and said tape head as a function of the location of said control pulse indicator marks; and (C) the location of said control pulse indicator marks interacting with said feedback circuit means to cause the rotational velocity of said rotating tape head to constantly oscillate between a predetermined maximum and minimum value, the location of said control pulse indicator marks varying according to a plurality of different patterns interspaced throughout the length of said video tape, each said pattern repeating for a predetermined time interval.

4. Apparatus according to claim 3, wherein the location of said control pulse indicator marks causes the rotational velocity of said rotating tape head to vary in a sinusoidal manner.

5. A video tape, comprising:

a magnetic tape;

video information stored on said magnetic tape in the form of a plurality of video tracks, each of said video tracks containing a vertical synch pulse including a plurality of subpulses, selected ones of said vertical synch pulses being modified by varying the number, width or height of said subpulses in said modified synch pulse;

said vertical synch pulses being divided into a plurality of successive groups of synch pulses, each group including a plurality of successive synch pulses, the sequence of modified and unmodified synch pulses in each said group defining a modified synch pulse pattern for that group, said modified synch pulse pattern of each said group being the same as said modified synch pulse pattern of some, but not all, of the other of said groups, in such a manner that such tape includes a plurality of different modified synch pulse patterns interspaced through said tape.

* * * * *